United States Patent
Kobyakov et al.

(10) Patent No.: US 9,898,174 B2
(45) Date of Patent: Feb. 20, 2018

(54) PREVIEWING EXPANDABLE CONTENT ITEMS

(75) Inventors: Pavel Kobyakov, Kitchener (CA); Fedor Labounko, Mountain View, CA (US)

(73) Assignee: Google LLC, Mountain View, CA (US)

( * ) Notice: Subject to any disclaimer, the term of this patent is extended or adjusted under 35 U.S.C. 154(b) by 535 days.

(21) Appl. No.: 14/380,774

(22) PCT Filed: Feb. 28, 2012

(86) PCT No.: PCT/UA2012/000019
§ 371 (c)(1),
(2), (4) Date: Aug. 25, 2014

(87) PCT Pub. No.: WO2013/130026
PCT Pub. Date: Sep. 6, 2013

(65) Prior Publication Data
US 2015/0026584 A1    Jan. 22, 2015

(51) Int. Cl.
*G06F 3/048* (2013.01)
*G06F 3/0484* (2013.01)
*G06Q 30/02* (2012.01)

(52) U.S. Cl.
CPC ......... *G06F 3/04842* (2013.01); *G06Q 30/02* (2013.01); *G06Q 30/0277* (2013.01)

(58) Field of Classification Search
CPC .................... G06F 17/30884; G06F 17/30896
See application file for complete search history.

(56) References Cited

U.S. PATENT DOCUMENTS

| 2005/0275662 | A1* | 12/2005 | DiStefano, III | G06F 17/24 345/619 |
| 2007/0011258 | A1* | 1/2007 | Khoo | G06F 3/0482 709/206 |
| 2007/0058226 | A1* | 3/2007 | Lu | H04N 1/00413 358/527 |
| 2009/0007012 | A1* | 1/2009 | Mandic | G06F 3/0481 715/810 |
| 2009/0300490 | A1* | 12/2009 | Lejano | G06F 17/212 715/277 |

(Continued)

*Primary Examiner* — William Bashore
*Assistant Examiner* — Rayeez Chowdhury
(74) *Attorney, Agent, or Firm* — Fish & Richardson P.C.

(57) ABSTRACT

This specification describes methods, systems, and apparatus, including computer programs encoded on a computer-readable storage device, for providing a preview of an expandable content item. The subject matter of the specification is embodied in a method that includes presenting an interface configured to receive input for designating characteristics associated with an expandable content item and receiving, via the interface, a designation of one or more directions for expansion of the expandable content item. The method also includes presenting a control for enabling selection of a preview option, and receiving a selection of the control. The method further includes presenting a preview interface responsive to receiving the selection of the control, the preview interface including an option for designating a selection of at least a first or a second different preview environment. The preview interface also includes a preview area that displays the expandable content item in accordance with the one or more directions in a position on a page.

18 Claims, 8 Drawing Sheets

(56) References Cited

U.S. PATENT DOCUMENTS

2009/0307085 A1* 12/2009 Lejano .................. G06Q 30/02
  705/14.49
2013/0124342 A1* 5/2013 Virkar ................ G06Q 30/0241
  705/14.73

* cited by examiner

PREVIEWING EXPANDABLE CONTENT ITEMS

CROSS-REFERENCE TO RELATED APPLICATION

This application is a National Stage Application under 35 U.S.C. § 371 and claims the benefit of International Application No. PCT/UA2012/000019, filed Feb. 28, 2012. The disclosure of the foregoing application is hereby incorporated by reference in its entirety.

BACKGROUND

This specification relates to information presentation.

Sponsored content (e.g. advertisements, deals or special offers) can be provided over the Internet to various user devices. For example, a web page can include slots in which sponsored content can be presented. These slots can be defined in the web page or defined for presentation with a web page, for example, along with search results or other content. Sponsored content can also be delivered through dedicated web portals or applications executing on the user devices.

SUMMARY

In general, in one aspect, a computer implemented method includes presenting an interface configured to receive input for designating characteristics associated with an expandable content item and receiving, via the interface, a designation of one or more directions for expansion of the expandable content item. The method also includes presenting a control for enabling selection of a preview option, and receiving a selection of the control. The method further includes presenting a preview interface responsive to receiving the selection of the control, the preview interface including an option for designating a selection of at least a first or a second different preview environment. The preview interface also includes a preview area that displays the expandable content item in accordance with the one or more directions in a position on a page.

In another aspect, a computer implemented method includes identifying an expandable content item including one or more characteristics. At least one characteristic relates to a direction of expansion for the expandable content item when in an expanded state as compared to a compact state. The method also includes presenting a preview interface to a user for the expandable content item. The preview interface includes an option for designating a selection of at least a first or a second different preview environment, and a preview area that displays the expandable content item in accordance with the direction of expansion in a position on a page.

In another aspect a system includes a sponsor interface engine and a preview interface engine. The sponsor interface engine is configured to present an interface for receiving an input for designating characteristics associated with an expandable content item, and a designation one or more directions for expansion of the expandable content item. The sponsor interface engine is further configured to present a control for enabling selection of a preview option and receive a selection of the control. The preview interface engine is configured to present a preview interface responsive to receiving the selection of the control. The preview interface includes an option for designating a selection of at least a first or a second different preview environment, and a preview area that displays the expandable content item in accordance with the one or more directions in a position on a page.

In another aspect, a system includes a sponsor interface engine and a preview interface engine. The sponsor interface engine is configured to receive identification of an expandable content item including one or more characteristics where at least one characteristic relates to a direction of expansion for the expandable content item when in an expanded state as compared to a compact state. The preview interface engine is configured to present a preview interface to a user for the expandable content item, where the preview interface includes an option for designating a selection of at least a first or a second different preview environment, and a preview area that displays the expandable content item in accordance with the direction of expansion in a position on a page.

In another aspect, a computer readable storage device has encoded thereon computer readable instructions, which when executed by a processor, cause a processor to perform some operations. The operations include presenting an interface configured to receive input for designating characteristics associated with an expandable content item and receiving, via the interface, a designation of one or more directions for expansion of the expandable content item. The operations also include presenting a control for enabling selection of a preview option, and receiving a selection of the control. The operations further include presenting a preview interface responsive to receiving the selection of the control, the preview interface including an option for designating a selection of at least a first or a second different preview environment. The preview interface also includes a preview area that displays the expandable content item in accordance with the one or more directions in a position on a page.

In another aspect, a computer readable storage device has encoded thereon computer readable instructions, which when executed by a processor, cause a processor to perform operations that include identifying an expandable content item including one or more characteristics. At least one characteristic relates to a direction of expansion for the expandable content item when in an expanded state as compared to a compact state. The operations also include presenting a preview interface to a user for the expandable content item. The preview interface includes an option for designating a selection of at least a first or a second different preview environment, and a preview area that displays the expandable content item in accordance with the direction of expansion in a position on a page.

Implementations can include one or more of the following.

The expandable content item can be presented in an unexpanded state in the preview interface. A triggering action can be received for expanding the expandable content item. An expanded state of the expandable content item can be presented responsive to receipt of the triggering action.

The first preview environment can be a JavaScript environment and the second preview environment can be an iFrame environment. The expandable content item can be an advertisement. A suggested designation for expansion of the expandable content item can be provided, wherein the suggested designation includes at least one direction of expansion that is different from the designation of the one or more directions. The position of the expandable content item on the page can be based on the designation of the one or more directions. The interface can be configured to allow selection of a size of expansion of the expandable content. The control can include selection options provided to the user for designating parameters for rendering the expandable content item in the preview interface.

The interface can be configured to allow selection of a size of expansion of the expandable content. The preview interface can be configured to display the expansion of the expandable content based also on at least one additional characteristic different from the direction of expansion. The expansion of the expandable content in the preview interface can be triggered by an interaction with the expandable content. Particular implementations may realize none, one or more of the following advantages. Content sponsors can preview both the expanded and non-expanded versions of their expandable content items to ensure that the content item is being rendered as desired in both forms. More than one preview environment can be provided in a unified interface. Expandable content items that use third party files can be rendered safely in the unified interface that does not compromise the security of the interface.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, processes and systems for providing a preview interface for previewing expandable content items. At times a content item (such as a sponsored content item like an advertisement) is presented to a user (for example, in a web browser) in a normal or unexpanded form. When the user interacts with the content item in a particular way, for example, by interacting with (e.g., clicking the content item or hovering a pointer over the content item), the content item can be rendered in an expanded form. Such content items are referred to herein as expandable content items. For example, a content item can be initially presented in an unexpanded form as a 728×90 pixel graphical item. When a user selects or interacts with this content item, an expanded view of 728×270 pixels can be presented. In this example, the content item expands in only one direction; however, other combinations involving expansion in one or more other directions (e.g., the four directions UP, DOWN, LEFT, and RIGHT) are be possible.

The direction(s) of expansion for a given content item can be configured or selected, for example, by a sponsor of the content item. In some implementations, the direction(s) of expansion for a given content item can be selected based on the initial position of the content item. For example, if the content item is initially presented at the top right corner of a browser, the direction(s) of possible expansion(s) could include one or more of or a combination of DOWN and LEFT. Due to potential unavailability of viewable area in the browser, it may not make sense to expand such a content item in the UP or RIGHT directions. On the other hand, if the initial position of the content item is at the center of a viewable area of a browser, such a content item may be expanded in any combination directions. In some implementations, the direction of expansion can also be constrained by interference with other content on a page, for example, ads or other publisher content.

Using the preview interface described herein, a content sponsor can preview an expandable content item in both expanded and unexpanded forms to ensure that the substance and position of the content item is rendered as desired. In some implementations, the expandable content items can use one or more publisher side files (generally referred to as third party files), for example, a HyperText Markup Language (HTML) file hosted by the publisher, to be rendered in the expanded form. The preview system described herein allows rendering of such content items without directly including the third party files in the system and thereby avoiding potential security threats that the third party files may pose.

Figure 1:
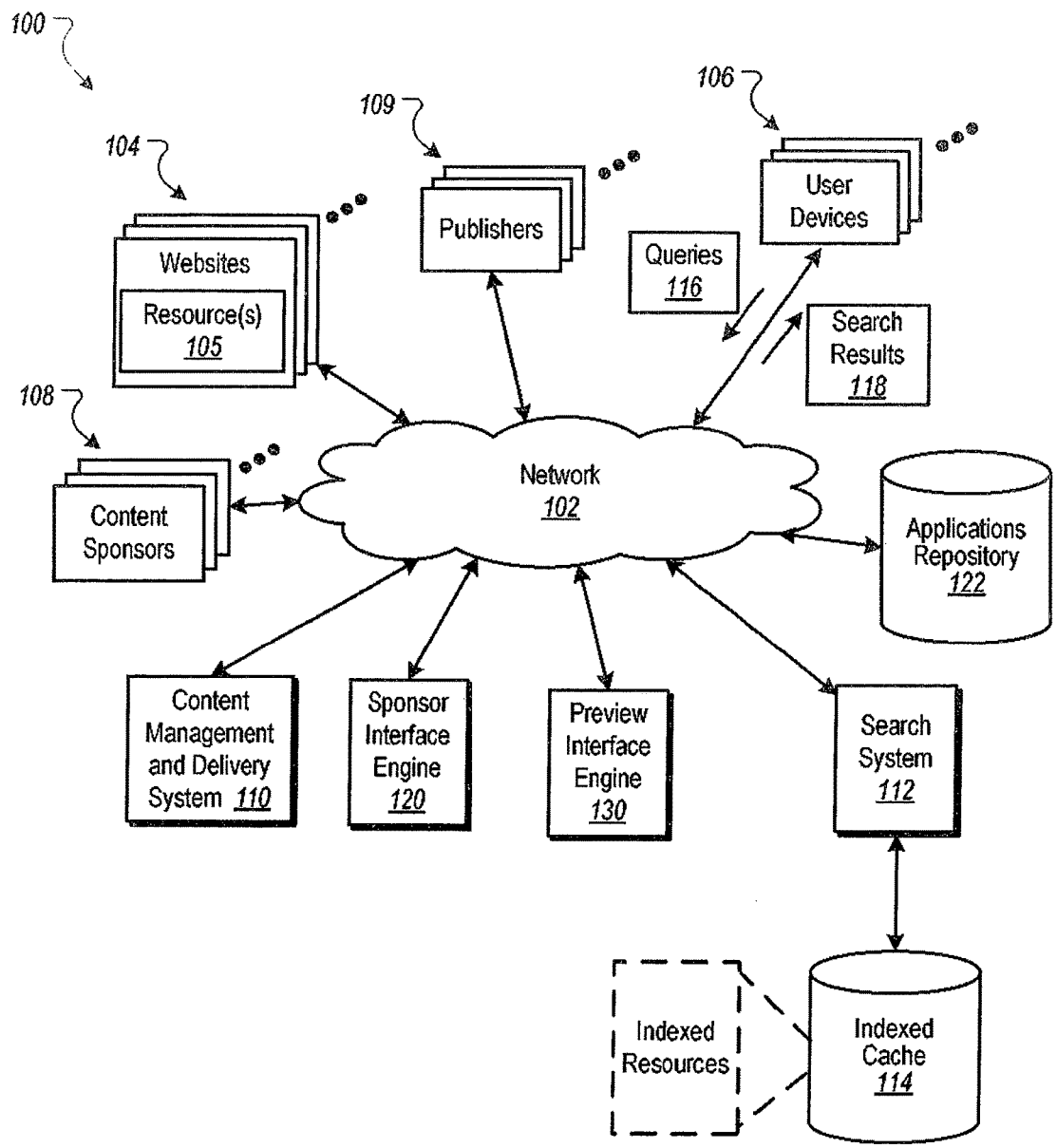
FIG. 1 is a block diagram of an example environment for delivering content.

FIG. 1 is a block diagram of an example environment 100 for delivering content. The example environment 100 includes a content management and delivery system 110 for selecting and providing content to user devices. The example environment 100 includes a network 102, such as a local area network (LAN), a wide area network (WAN), the Internet, or a combination thereof. The network 102 connects websites 104, user devices 106, content sponsors 108 (e.g., advertisers), content publishers 109, and the content management and delivery system 110. The example environment 100 may include many thousands of websites 104, user devices 106, content sponsors 108 and content publishers 109.

In some implementations, the content management and delivery system 110 includes a request handler that can receive a request for content from a user, identify one or more eligible content items, and provide a content item responsive to the request. In some implementations, the content management and delivery system 110 can deliver sponsored contents or campaigns even in the absence of a request for content. For example, the content management and delivery system 110 can be configured to periodically deliver sponsored content (e.g. daily or weekly deals and offers) to mobile devices. In some implementations, the content management and delivery system 110 can also be configured to deliver sponsored content to a user device 106 based on a geographical location of the user device 106. For example, if the user device is carried by the user into a new locality, the content management and delivery system 110 can be configured to deliver content from local sponsors (e.g. local deals and offers) to the user device 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts). In some implementations, the resources 105 can include sponsored content provided by the content sponsors 108. For example, the resources 105 can include an advertisement, a deal or a special offer sponsored by a content sponsor 108.

A user device 106 is an electronic device that is under control of a user and is capable of requesting and receiving resources over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102. In some implementations, the user device 106 can be configured to execute applications that are configured to receive/generate/manage sponsored or other content and campaigns from the content management and delivery system 126. In some implementations, such applications can include third-party applications that can be downloaded to the user device 106 from an applications repository 122. Sponsored and/or targeted content can also be delivered to the user devices 106 through a messaging service such as using text or multimedia messaging.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by, for example, crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the cache or index to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation) and information related to roles.

When a resource 105, search results 118 and/or other content are requested by a user device 106, the content management system 110 receives a request for content. The request for content can include characteristics of the slots that are defined for the requested resource or search results page, and can be provided to the content management and delivery system 110.

The content management and delivery system 110 can select from the eligible content items that are to be provided to the user device 106 based at least in part, for example, on results of an auction (or by some other selection process). For example, for the eligible content items, the content management and delivery system 110 can receive offers from content sponsors 108 and allocate or prioritize delivery of the content items, based at least in part on the received offers (e.g., based on the highest bidders at the conclusion of the auction or based on other criteria, such as those related to satisfying open reservations). The offers represent the amounts that the content sponsors are willing to pay for delivery (or selection) of their content to a user device 106 either independently or with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable/observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by delivering content that is more likely to be of interest to the user. For example, content items (e.g., ads, special offers or daily deals) that are delivered to a user device 106 can be selected in part based on user preferences represented in corresponding interest profiles 128, which can also be an indication of how likely the user is to react positively to a content item, e.g., leading to a conversion.

The environment 100 can also include a sponsor interface engine 120 that launches a sponsor interface to allow a content sponsor 108 to create, edit, or otherwise manipulate content that is delivered to user devices 106 by the content management and delivery system 110. For example, the sponsor interface engine 120 can be configured to allow a sponsor to designate one or more characteristics of expandable content items managed by the content management and delivery system 110. In some implementations, the sponsor interface engine 120 can be configured to receive one or more characteristics associated with an expandable content item. The characteristics can include, for example, a position of an unexpanded content item, a position of a corresponding expanded version of the content item, size of the content item in the expanded and unexpanded forms, one or more directions of expansion, or substance that is to be rendered within the content item. In some implementations, the sponsor interface engine 120 can be configured to provide a control for enabling a preview option for the expandable content items.

In some implementations, when the preview option is enabled, the sponsor interface engine 120 can be configured to present a preview interface for previewing the expandable content item. In some implementations, the sponsor interface engine communicates with a preview interface engine 130 to launch the preview interface. The preview interface can allow for rendering a preview of an expandable content item in one or more preview environments. In some implementations, the preview interface engine 130 can be configured to provide an option for receiving a selection of the one or more preview environments. The preview environments can include, for example, a JavaScript environment and an iFrame environment. The preview interface further includes a preview area that displays expandable content items in accordance with corresponding inputs (for example, directions of expansion) received via the sponsor interface engine 120. For example, the preview interface can present an expandable content item in an unexpanded state, and present an expanded state of the expandable content item responsive to receiving a triggering action. The triggering action can be received via the preview interface engine 130 and can include, for example, a user input such as a mouse click on the unexpanded rendering of the content item.

Even though the sponsor interface engine 120 and the preview interface engine 130 are depicted as separate modules in the environment 100, in some implementations, the preview interface engine 130 may be included in the sponsor interface engine 120. For example, the sponsor interface engine 120 can be configured to launch the preview interface as needed.

For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, users can opt out of being characterized or targeted for content, including advertisements, based on the interest profiles for which they may be characterized.

Figure 2A:
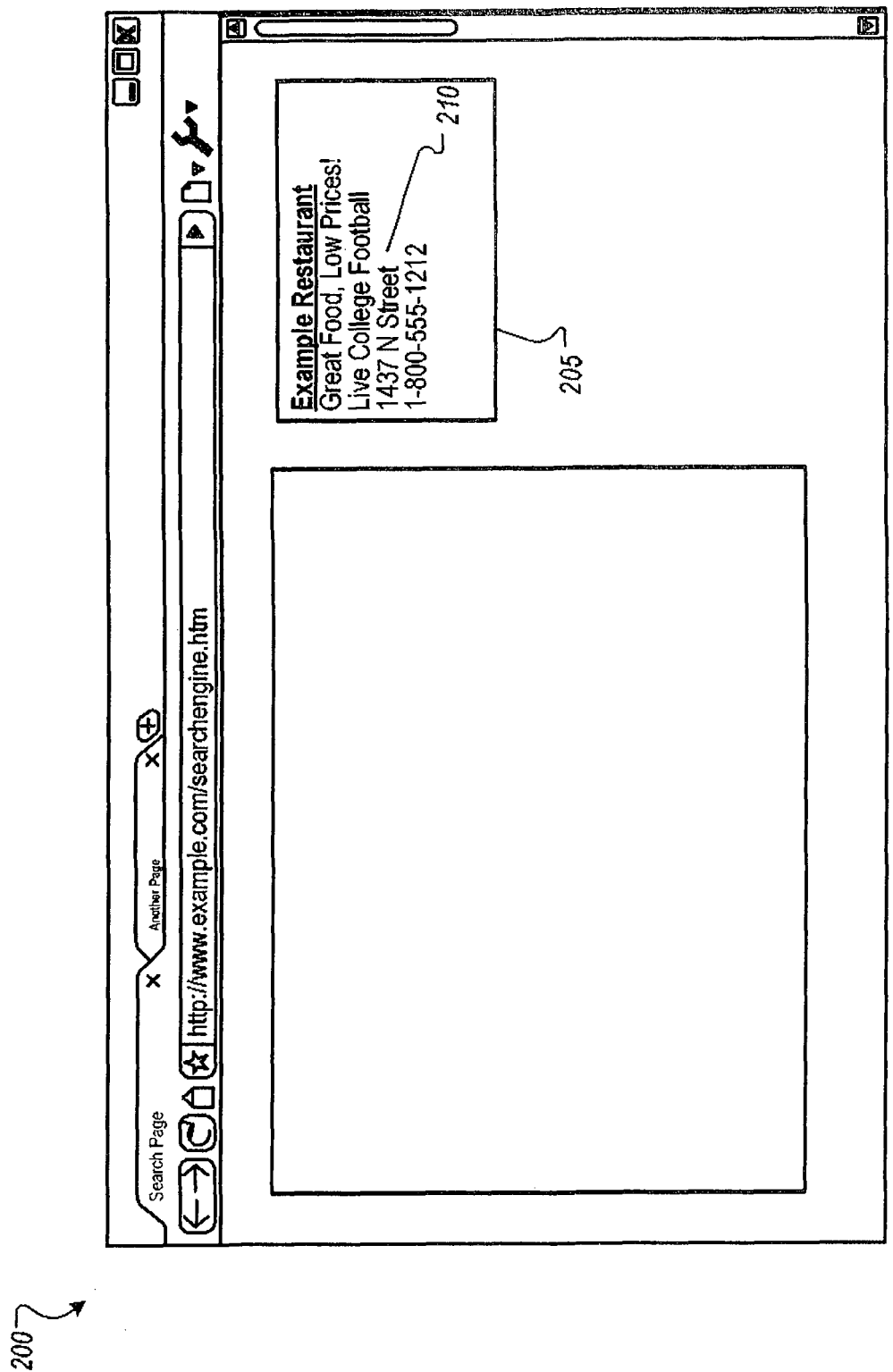
FIG. 2A shows an example of a browser displaying a sponsored content item.

FIG. 2 shows an example user interface 200 in which content (such as sponsored content or requested content, or both) is provided to a user device 106. For example, the content management and delivery system 110 can provide content (e.g., advertisements, offers, etc.) from a pool of available content items. Such targeted content delivery can be done in response to received requests to deliver content to the user interface. In some implementations, the content can be delivered to the user device 106 (e.g. randomly, periodically, or based on a location) without receiving a request for content delivery. Even though the example in FIG. 2 describes content delivery through a portion of a browser, in general, the user interface can be a part of a stand-alone application (e.g., a third-party application for delivering targeted offers), a text message, a multimedia message or an e-mail.

In some implementations, the user interface 200 can be, for example, a social networking web page or some other resource (e.g., a resource displayed in a web browser) that is presented, for example, on the user device 106. The user interface 200 can include one or more content item slots 205, e.g., for displaying content such as advertisements or offers on the web page. To fill the content item slots 205, for example, a request for content can be provided by the user device 106 to the content management and delivery system 110. Upon receipt of the request for content, the content management system 110 can provide content items 210 that are responsive to the request, as described above. In some implementations, the content item 210 can be provided in the absence of a request for content.

In some implementations, the one or more content items 210 that are selected can be selected by conducting an auction. For example, the auction can include one or more bids associated with the content sponsors 108 that elected to target users 250 having a specific interest in the corresponding interest profiles 128. As a result, the content items 210 that are provided can be based at least in part on the auction and the information in the interest profiles 128, as well as other information that can typically be used for selecting content items, e.g., including the relevance of content items to a time of the day, geographical location, keywords, or content item requests, to name a few examples.

Figure 2B:
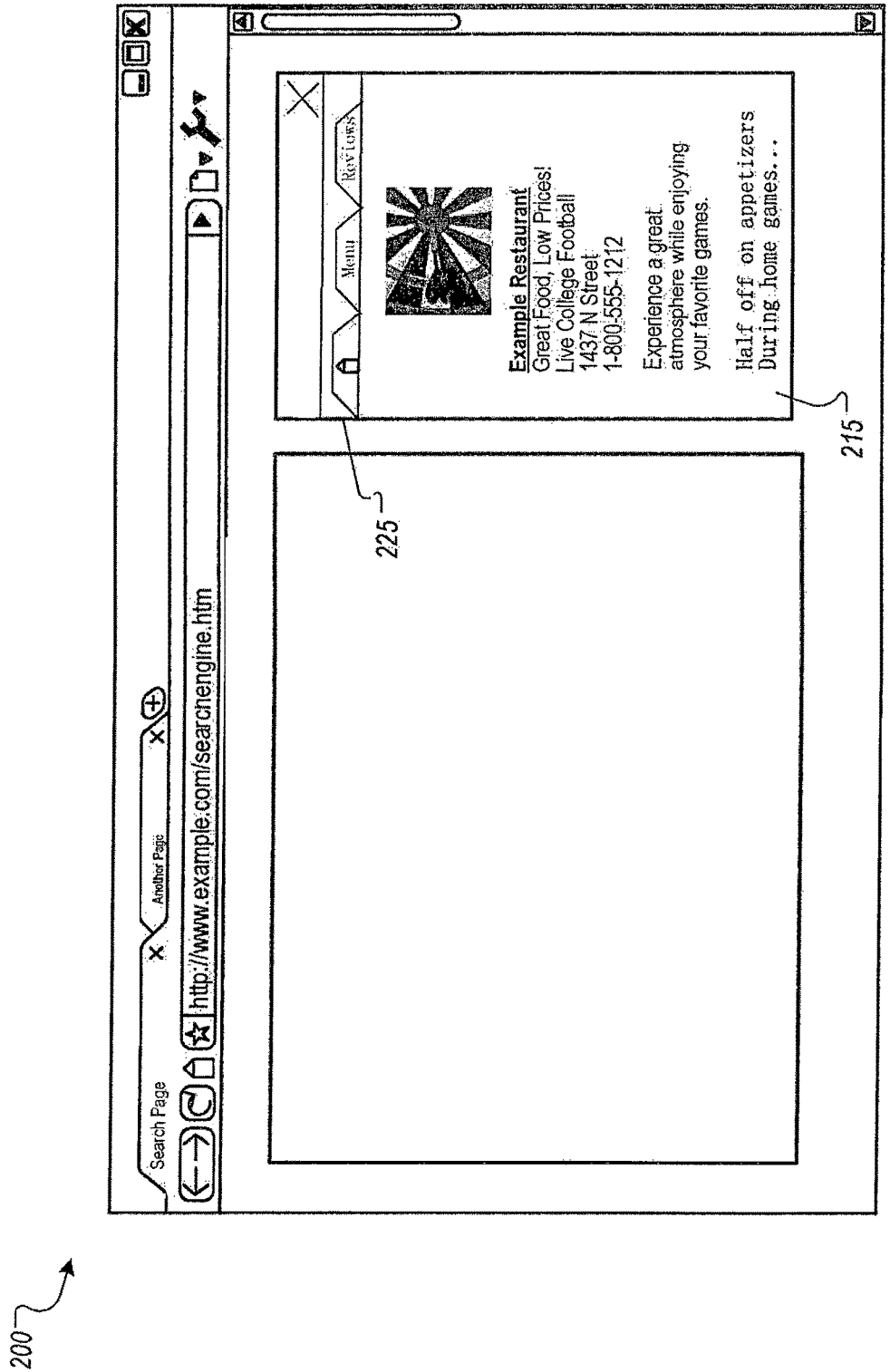
FIG. 2B is an example of a browser displaying an expanded version of the sponsored content item.

In some implementations, an unexpanded version of the content item can be provided in the content item slot 205. When a user interacts with the content item 210 or with a trigger mechanism associated with the content item 210, the content item can be rendered in an expanded version. For example an expanded version 215 of the content item 210 is shown in the example of FIG. 2B. The expanded version 215 can be provided to accommodate additional information. The expanded version 215 can include additional content, for example, images, larger text, audio, video, or web-based content. In one example, the content item 210 is presented first as an advertisement in textual format while enabling the user to expand the advertisement into a menu-driven, graphical advertisement in the expanded version 215. In some implementations, the action taken by the user to initiate launching the expanded version 215 can include selecting an expansion icon, selecting a marker on the side, below or above the content item, selecting or hovering a pointer over a particular portion of the content item, or, another form of user initiated and controlled action. The expanded content item 215 can also include a marker that the user can click or otherwise select such that the expanded content item 215 is replaced by the unexpanded content item 210.

In some implementations, the expanded item 215 can include a menu-based graphical content item as shown in FIG. 2B. The expanded content item 215 can include one or more navigation options 225 that a user can select to navigate to additional content (e.g., other content such as web pages). In the example shown in FIG. 2B, the expanded content item 215 is an advertisement for a restaurant. In this example, the navigation options 225 include a home tab, a "menu" tab, and a "reviews" tab. In some implementations, a content sponsor can configure the substance and presentation of both the unexpanded content item 210 and the expanded content item 215.

Figure 3:
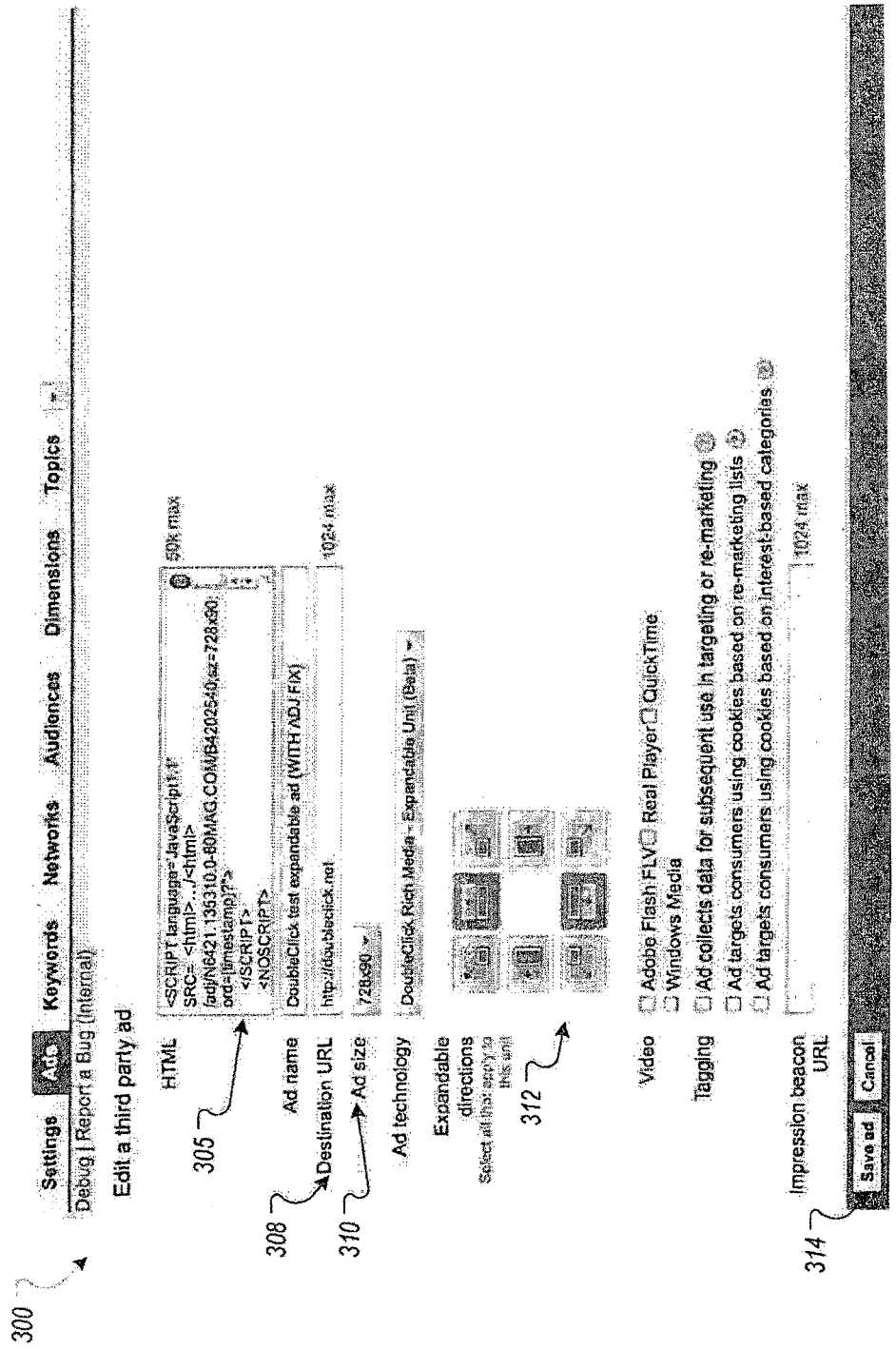
FIG. 3 is an example of a sponsor interface for designating characteristics of an expandable content item.

Configuring the substance and the presentation of the unexpanded content item 210 and the expanded content item 215 can include configuring where in a given viewable area (such as a browser window) the content items appear both in the non-expanded form as well as in the expanded form. FIG. 3 is an example of a sponsor interface 300 for designating characteristics of an expandable content item. The sponsor interface 300 can be presented by the sponsor interface engine 120 described above with reference to FIG. 1. The sponsor interface 300 allows a sponsor to communicate with the sponsor interface engine 120 to create, edit or otherwise manipulate expandable content items such as expandable advertisements. Even though the example in FIG. 3 depicts an interface for editing advertisements, other content can also be edited.

The sponsor interface 300 can include various elements including text boxes, options and menus for receiving one or more characteristics associated with expandable content items. For example, the appearance of the content item can be specified using, for example, HTML code 305. The sponsor interface 300 can also include one or more hyperlinks related to the expandable content item. For example, a destination uniform resource locator (URL) 308 that points to a landing page can be specified using the sponsor interface 300. The sponsor interface 300 can also include a control to allow a specification of a size 310 of the content item. In some implementations, the size of the unexpanded form as well as the expanded form can be specified. In some implementations only the size of the unexpanded form is specified whereas the size of the expanded form is predetermined and/or a function of a direction of expansion. For example, the expanded form can be larger by a factor of a predetermined number (e.g., three) in one or more or each of the directions of expansion. In such cases a 728×90 pixel content item could be expanded to 728×270 pixels when expanded only in width and to 2184×270 pixels when expanded both in length and width.

The sponsor interface 300 can also include a control to allow specification of one or more possible directions of expansion. The one or more directions of expansion can be presented as graphical icons 312 that a sponsor can use to specify which direction or directions an expandable content item should be expanded. In some implementations, the sponsor interface 300 may also provide one or more additional suggestions to the sponsor based on a selection of the sponsor and/or characteristics of the expandable content item known to the sponsor interface engine. For example, if a sponsor selects an UP expansion for an unexpanded content item initially placed at a lower right corner of a viewing area, the sponsor interface 300 may present suggestions that a LEFT expansion or a LEFT and UP expansion can also be selected. The suggestions can also be based on, for example, a content of the expanded version. For example, if the expanded version is known to include a video, a LEFT and UP expansion may be recommended rather than a simple UP expansion. In another example, if the expanded view includes a banner display, a LEFT expansion can be recommended. The sponsor interface 300 can allow a sponsor to specify various other characteristics associated with a content item, including, for example, associated keywords, networks, target audiences, dimensions, topics or other settings. In some implementations, more or fewer number of characteristics than shown in the example of FIG. 3 may be presented in the sponsor interface 300.

In some implementations, the sponsor interface 300 can include a control for enabling a preview option. The preview option can launch a preview interface that displays a content item in accordance with characteristics specified, for example, using the sponsor interface 300. In some implementations, a "launch" button can serve as the control for enabling the preview option. In some implementations, the preview interface is launched as soon as the characteristics specified through the sponsor interface 300 are saved, for example, using a "save" button 314. In some implementations, other forms of control such as a dedicated button or icon may be provided in the sponsor interface 300 for controlling expansion.

Figure 4A:
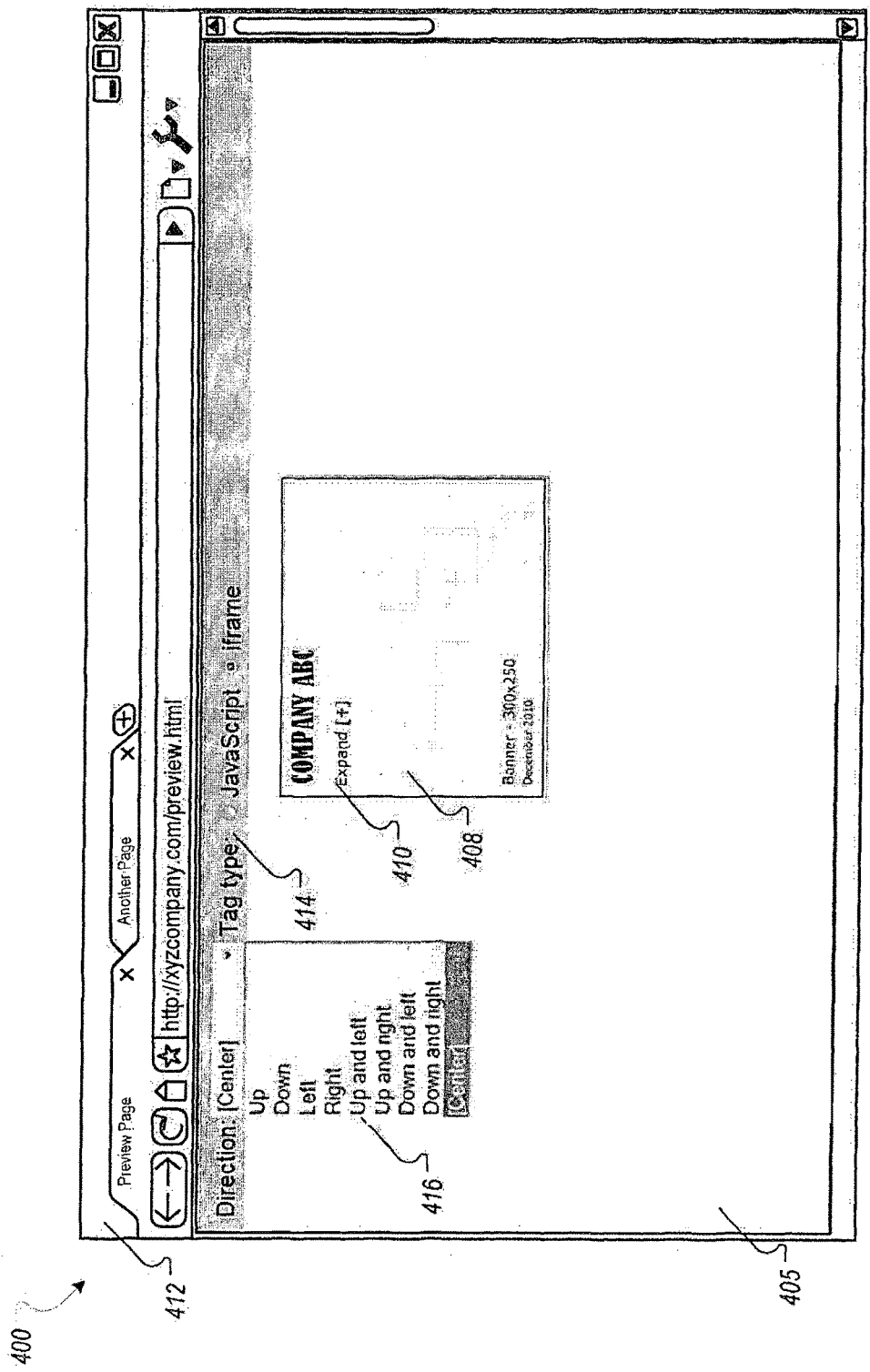
FIGS. 4A-4B are examples of a preview interface.
Figure 4B:
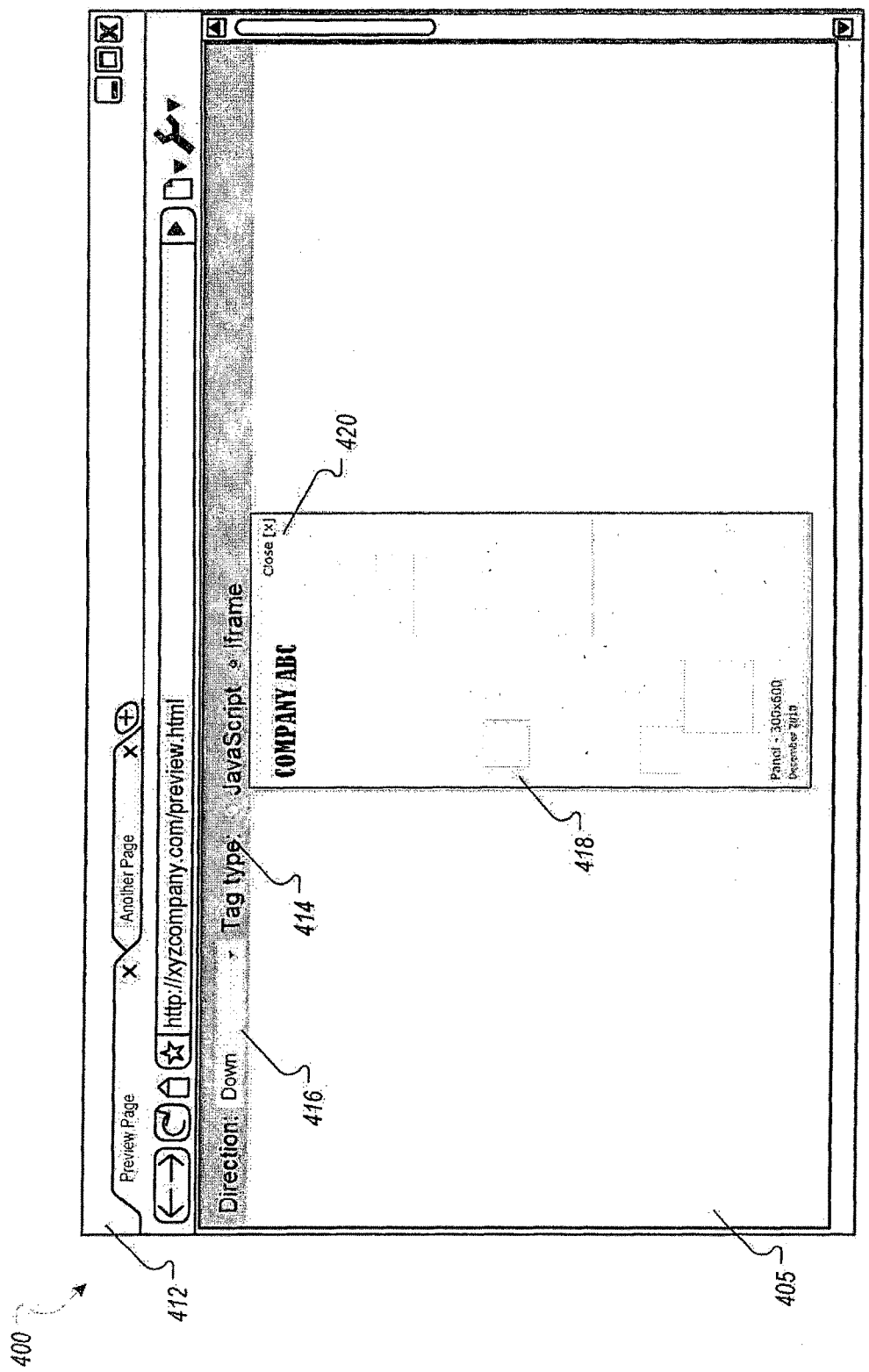

FIGS. 4A-4B show examples of a preview interface 400. In some implementations, the preview interface 400 can be launched by a preview interface engine 130 described with reference to FIG. 1. In some implementations, the preview interface 400 can also be launched by the sponsor interface engine 120 described with reference to FIG. 1. The preview interface 400 can include a preview area 405 in which a preview of an expandable content item (for example, the expandable content item 408) can be rendered. The expandable content item 408 shown in FIG. 4A is in an unexpanded state and includes a control 410 for triggering an expansion. When a user interacts with the control 410, for example by clicking on it, the expansion can be triggered. In some implementations, the expandable content item 408 may not include an explicit control such as the control 410. In some implementations, the expansion may be triggered, for example, when a user hovers a pointer over a portion of the expanded content item 408 or otherwise selects the expandable content item 408 or any portion thereof. The expandable content item 408 may include one or more characteristics of the content item 210 described with reference to FIG. 2A. The examples of FIGS. 4A-4B show the preview interface as being rendered in a browser 412. However, other user interfaces that do not depend on a browser are also within the scope of the present disclosure.

In some implementations, the preview interface 400 can include an option 414 for designating a selection of preview environments. In this example, the preview interface allows for selecting a JavaScript environment or an iFrame environment. However, any number and types of preview interfaces can be included in the option 414. The preview environments can be selected by selection buttons as shown in FIGS. 4A-4B or using another form of selection method such as one using a drop down menu. In some implementations, the preview environment may also be selected using the sponsor interface 300 described with reference to FIG. 3.

In some implementations, the preview interface 400 can be served using, for example, an html file (preview.html) hosted by a dedicated host in a particular domain such as <externalcontent.xyzcompany.com/preview.html>. In some implementations, third party content may not be needed for rendering an expansion. This can be the case, for example, when material needed for the expansion is provided as an in-page script such as JavaScript. In some implementations, no third party files are needed for rendering the expansion and the preview.html file can load, for example, a preview.js JavaScript file to render the expansion within the JavaScript environment.

Under an iFrame environment, however, third party content is needed for rendering the expansion. In such cases the domain <externalcontent.xyzcompany.com> can be configured to serve the required third party content (for example, publisher side files or files that are substantially similar to the publisher side files) that are used for expansion within the iFrame environment. In such cases, the preview interface engine can be configured to create an appropriate iFrame where the source of the third party content is set as the domain from which the third party content is being served. This can be done, for example, by augmenting the preview.js file to load a second html file that triggers creation of the appropriate iFrame. The preview.js file may load the second html file when an iFrame preview is requested. By hosting the iFrame serving third party content at a different site than the main preview page, the methods and systems described herein allow for providing a unified interface that facilitates both scripts as well as third party content based previews of expandable content items.

In some implementations, the preview interface 400 includes a control 416 (e.g., a drop down menu) that allows for selection of one or more directions of expansion of the expandable content item. In this example, the direction of expansions can be selected as UP, DOWN, LEFT, RIGHT, or as a combination of the directions UP and LEFT, UP and RIGHT, DOWN and LEFT and DOWN and RIGHT. Other combinations including three or four directions may also be possible. Once a user activates the control 410, the preview interface 400 can be configured to render an expanded version of the content item 408 in accordance with the direction selected from the control 416.

FIG. 4B shows an example of how an expanded content item 418 is rendered in accordance with the direction selected using the control 416. In this example, the direction DOWN is selected and therefore the preview interface 400 renders the content item 418 such that it is expanded in a downward direction with respect to the position of the unexpanded content item 408 in the preview area 405. Due to the downward expansion, the expanded content item 418 is rendered as a 300×600 pixel graphical item whereas the unexpanded content item 408 is rendered as 300×250 pixel graphical item. The preview interface 400 allows a sponsor to visualize how an expandable content item will be rendered when the content item is actually published in a publisher page. In some implementations, the expanded content item 418 can include a control 420, which, when selected, makes the preview interface 400 display the unexpanded content item 408.

Figure 5:
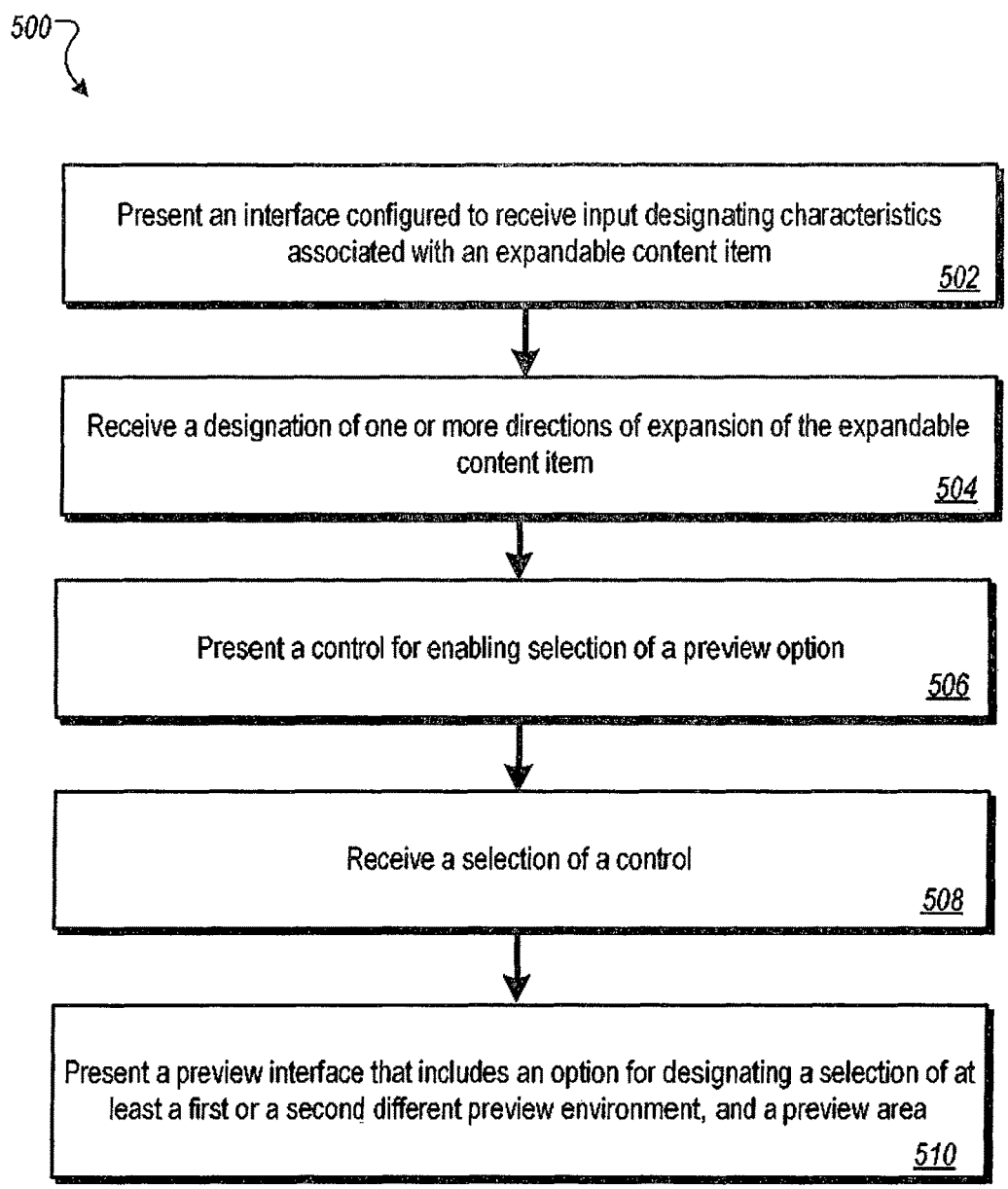
FIG. 5 is a flowchart of an example process for presenting a preview interface.

FIG. 5 is a flowchart of an example process for presenting a preview interface. In some implementations, the process 500 can be performed by the sponsor interface engine 120 and/or the preview interface engine 130, possibly in communication with the content management and delivery system 110 described with reference to FIG. 1.

Operations of the process can include presenting an interface configured to receive input designating characteristics associated with an expandable content item (502). In some implementations, the presented interface can be substantially similar to the interface 300 described with reference to FIG. 3. The interface can be presented, for example, at least in part by the sponsor interface engine 120. The sponsor interface engine 120 can facilitate communications between content sponsors (such as advertisers) and the content management and delivery system 110 through the presented interface. The interface can be presented in various forms including, for example, in a browser, via a standalone application (such as an application on a mobile device), via a dedicated user interface, or in an e-mail.

A designation of one or more directions of expansion of the expandable content item is received (504). The designation of, the one or more directions can be received, for example, through a sponsor interface 300 as described with reference to FIG. 3. In some implementations, the designation of the one or more directions can also be received through a preview interface 400 described with reference to FIG. 4.

A control for enabling a selection of a preview option is presented (506). The control for enabling the selection of the preview can be presented, for example, in a sponsor interface such as the sponsor interface 300 described with reference to FIG. 3. A selection of the control can also be received (508), e.g., through the sponsor interface 300.

A preview interface is presented (510). In some implementations, the preview interface includes an option for designating a selection of at least a first or a second different preview environment. The first environment can be a script based environment such as a JavaScript environment, and the second environment can be a third party content based environment such as an iFrame environment.

The preview interface also can include a preview area. The preview interface can be substantially similar to the preview interface 400 described with reference to FIGS. 4A and 4B. The preview area can be configured to display an expandable content item on a page in accordance with the one or more directions selected.

In some implementations, presenting the preview interface can include presenting the expandable content item in an unexpanded state in the preview area. Upon receiving a triggering action (such as a mouse click or pointer hover), an expanded state of the expandable content item can be presented within the preview area.

In some implementations, a suggested designation for the expansion of the expandable content item can be provided. The suggested designation can include, for example, a suggested direction of expansion over and above what has been chosen by a user.

Figure 6:
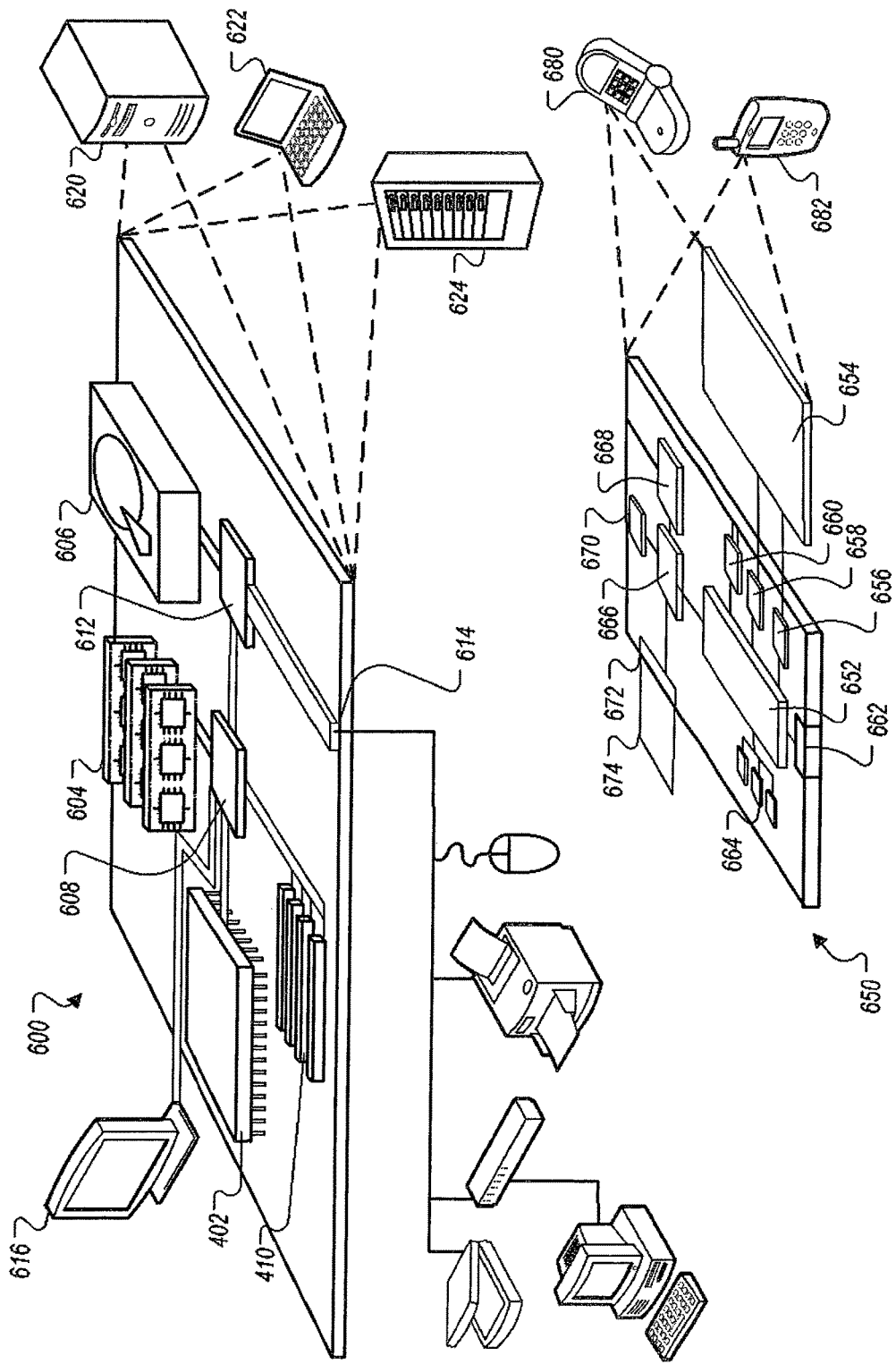
FIG. 6 is a block diagram of an example computer system that can be used to implement the methods, systems and processes described in this disclosure.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent various typically non-mobile devices, such as televisions or other electronic devices with one or more processors embedded therein or attached thereto. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650, may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   presenting an interface configured to receive input for designating characteristics associated with an expandable content item, with at least one of the characteristics being an initial height or an initial width of the expandable content item before expansion of the expandable content item;

receiving, via the interface, an expansion designation to expand at least the initial height or the initial width of the expandable content item in response to user interaction with the expandable content item;

prior to distributing the expandable content item to user devices:
presenting, in the interface, a control that enables selection of a preview option;
receiving, through the interface, a selection of the control; and
responsive to receiving the selection of the control, presenting, in the interface, a preview interface that includes a control that enables selection of a preview environment used to emulate expansion of the expandable content item, the preview interface including a preview area that displays the expandable content item, in a position on a page, at the initial height or initial width in accordance with the characteristic designation received via the interface, wherein the initial height or initial width is expanded according to the expansion designation of the expandable content item.

2. The method of claim 1, wherein presenting the preview interface includes:
presenting the expandable content item in an unexpanded state in the preview interface;
receiving a triggering action for expanding the expandable content item; and
presenting an expanded state of the expandable content item responsive to receipt of the triggering action.

3. The method of claim 1, wherein the preview environment comprises one of a JavaScript environment and an iFrame environment.

4. The method of claim 1, wherein the expandable content item is an advertisement.

5. The method of claim 1, further comprising providing a suggested designation for expansion of the expandable content item, the suggested designation including at least one direction of expansion that is different from the expansion designation of the initial height or the initial width.

6. The method of claim 1, wherein the initial position of the expandable content item on the page is based on the expansion designation of the initial height or the initial width.

7. The method of claim 1, wherein the interface is configured to allow selection of a size of expansion of the expandable content item.

8. The method of claim 1, wherein presenting the control further comprises providing a control that presents selection options to the user for designating parameters for rendering the expandable content item in the preview interface.

9. A system comprising:
a sponsor interface engine configured to present an interface for receiving an input for designating characteristics associated with an expandable content item, with at least one of the characteristics being an initial height or an initial width of the expandable content item before expansion of the expandable content item, and an expansion designation to expand at least the initial height or the initial width of the expandable content item in response to user interaction with the expandable content item, wherein the sponsor interface engine is further configured, prior to distributing the expandable content item to user devices, to present a control that enables selection of a preview option and receive a selection of the control; and
a preview interface engine configured to present a preview interface responsive to receiving the selection of the control, the preview interface including a control that enables selection of a preview environment used to emulate expansion of the expandable content item, and a preview area that displays the expandable content item, in a position on a page, at the initial height or initial width in accordance with the designation received via the interface wherein the initial height or initial width is expanded according to the expansion designation of the expandable content item.

10. The system of claim 9, wherein the preview interface engine is further configured to:
present the expandable content item in an unexpanded state in the preview interface;
receive a triggering action for expanding the expandable content item; and
present an expanded state of the expandable content item responsive to receipt of the triggering action.

11. The system of claim 9, wherein the preview environment comprises one of a JavaScript environment and an iFrame environment.

12. The system of claim 9, wherein the expandable content item is an advertisement.

13. The system of claim 9, wherein one of the sponsor interface engine or the preview interface engine is further configured to provide a suggested designation for expansion of the expandable content item, the suggested designation including at least one direction of expansion that is different from the expansion designation of the initial height or the initial width.

14. The system of claim 9, wherein the position of the expandable content item on the page is based on the expansion designation of the initial height or the initial width.

15. The system of claim 9, wherein the sponsor interface engine is configured to allow selection of a size of expansion of the expandable content item.

16. The system of claim 9, wherein presenting the control further comprises providing a control that presents selection options to the user for designating parameters for rendering the expandable content item in the preview interface.

17. A non-transitory computer readable storage device having encoded thereon computer readable instructions, which when executed by a processor, cause a processor to perform operations comprising:
presenting an interface configured to receive input for designating characteristics associated with an expandable content item, with at least one of the characteristics being an initial height or an initial width of the expandable content item before expansion of the expandable content item;
receiving, via the interface, an expansion designation to expand at least the initial height or the initial width of the expandable content item in response to user interaction with the expandable content item;
prior to distributing the expandable content item to user devices:
presenting, in the interface, a control that enables selection of a preview option;
receiving, through the interface, a selection of the control; and
responsive to receiving the selection of the control, presenting, in the interface, a preview interface that includes a control that enables selection of a preview environment used to emulate expansion of the expandable content item, the preview interface including a preview area that displays the expandable content item, in a position on a page, at the initial height or initial width in accordance with the characteristic designation received via the interface, wherein the initial height or initial width is expanded according to the expansion designation of the expandable content item.

18. The non-transitory computer readable storage device of claim 17, wherein the operations further comprise:

presenting the expandable content item in an unexpanded state in the preview interface;

receiving a triggering action for expanding the expandable content item; and presenting an expanded state of the expandable content item responsive to receipt of the triggering action.

\* \* \* \* \*

UNITED STATES PATENT AND TRADEMARK OFFICE
CERTIFICATE OF CORRECTION

| | |
|---|---|
| PATENT NO. | : 9,898,174 B2 |
| APPLICATION NO. | : 14/380774 |
| DATED | : February 20, 2018 |
| INVENTOR(S) | : Kobyakov et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 582 days.

Signed and Sealed this
Twelfth Day of February, 2019

Andrei Iancu
*Director of the United States Patent and Trademark Office*